(12) United States Patent
Maloratsky et al.

(10) Patent No.: US 7,436,350 B1
(45) Date of Patent: Oct. 14, 2008

(54) COMBINED AIRCRAFT TCAS/TRANSPONDER WITH COMMON ANTENNA SYSTEM

(75) Inventors: Leo G. Maloratsky, Indialantic, FL (US); Andrew M. Vesel, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 248 days.

(21) Appl. No.: 10/954,974

(22) Filed: Sep. 30, 2004

(51) Int. Cl.
G01S 13/74 (2006.01)
G01S 13/08 (2006.01)
G01S 7/40 (2006.01)
G01S 13/00 (2006.01)
G01S 13/93 (2006.01)

(52) U.S. Cl. .............. 342/30; 342/29; 342/42; 342/51; 342/118; 342/128; 342/129; 342/165; 342/173; 342/174; 342/175

(58) Field of Classification Search ............ 342/27–51, 342/118, 128–145, 165–175, 195, 25 R–25 F, 342/200–204; 701/300, 301, 3–18
See application file for complete search history.

(56) References Cited

U.S. PATENT DOCUMENTS 3,337,865 A * 8/1967 List .................. 342/201
4,471,344 A * 9/1984 Williams ................. 342/42
4,647,931 A * 3/1987 Mawhinney .............. 342/44
5,206,655 A * 4/1993 Caille et al. ............. 342/25 R
6,222,480 B1 4/2001 Kuntman et al. ........... 342/30
6,262,679 B1 * 7/2001 Tran ....................... 342/29
6,285,313 B1 * 9/2001 Wahab et al. .............. 342/174
6,392,598 B1 * 5/2002 Jones et al. .............. 342/174
6,531,978 B2 * 3/2003 Tran ....................... 342/29
6,587,069 B2 * 7/2003 Ringwald et al. ........... 342/30
7,006,032 B2 * 2/2006 King et al. ................ 342/29

FOREIGN PATENT DOCUMENTS

GB 2099257 A * 12/1982

OTHER PUBLICATIONS

"TCAS"; no author given; no date given; posted on Internet at aerowinx.de; copyright 1995-2002 in the name of Hardy Heinlin.*

* cited by examiner

Primary Examiner—Bernarr E Gregory
(74) Attorney, Agent, or Firm—Nathan O. Jensen

(57) ABSTRACT

The present invention is a combined aircraft TCAS/Transponder with common antenna system and transmitter. Common TCAS/Transponder multi-monopole top and bottom antennas may be connected to a top and bottom antenna modules, the top and bottom antenna modules being electrically coupled to the combined TCAS/Transponder transmitter/receiver block through connection lines.

4 Claims, 7 Drawing Sheets

COMBINED AIRCRAFT TCAS/TRANSPONDER WITH COMMON ANTENNA SYSTEM

FIELD OF THE INVENTION

This invention relates to aircraft TCAS and Transponder and more specifically to a combined TCAS/Transponder with common antenna system and transmitter.

BACKGROUND OF THE INVENTION

The Traffic/Alert collision Avoidance System (TCAS) located aboard a protected aircraft periodically transmits interrogation signals which are received by Transponders located aboard other aircraft, hereinafter referred to as target aircraft, in the vicinity of the protected aircraft. In reply to the interrogation signals, the target aircraft's transponder transmits a response signal. The TCAS equipment aboard the protected aircraft determines the range of the target aircraft in accordance with the round trip time between transmission on the interrogation signal and receipt of the response signal. Relative bearing to the target aircraft is determined from differences in the time to different elements in the TCAS antenna.

The Transponder is an airborne receiver-transmitter portion of air traffic control Radar Beacon System mode A and mode C interrogations as well as mode S interrogations. The Transponder sends an identifying coded signal in response to a received interrogation from a ground-based radar station to locate and identify the aircraft. Reply signals from the transponder are used to generate displays of the replying aircraft identification, position and altitude for air traffic controllers. The mode S function of the Transponder is used to transmit TCAS-related information between TCAS-equipped aircraft.

Generally TCAS and Transponder systems employ separate antennas and transmitters. Thus, each aircraft may include a top and bottom TCAS antenna and a top and bottom transponder antenna. Additionally, a separate cable is required for each antenna. Referring to FIG. 1, conventional separate aircraft TCAS and Transponder systems 100 are shown. TCAS top antenna 101 and bottom antenna 102 are connected through cables 103, 104 to a TCAS transmit/receive block 108, which includes TCAS switches 105, TCAS transmitter 106, TCAS receiver 107. Transponder top antenna 109 and bottom antenna 110 are connected through cables 111, 112 to a Transponder transmitter/receiver block 115, which includes Transponder switches 113, Transponder transmit/receive 114. The TCAS transmit/receive block 108 is connected to Transponder transmit/receive block 115 by communication link 116 and suppression line 117. This suppression feature prevents interference by other equipment, such as distance measuring equipment (DME). Conventional separate TCAS and Transponder systems require at least four antennas, separate cables and separate transmitters. Therefore these systems are heavy, occupy a substantial amount of space and are very costly.

These disadvantages of separate TCAS and Transponder systems may be eliminated with a combined TCAS/Transponder with a common antenna system and a common transmitter. A multifunctional aircraft transponder is disclosed in U.S. Pat. No. 6,222,480. FIG. 2 illustrates a combined TCAS Transponder system 200 as disclosed in U.S. Pat. No. 6,222, 480. Switch 205 connects the Transponder receivers 208, the TCAS receivers 207, and a combined TCAS/Transponder transmitter 206 to antennas 201 and 202 through cables 203 and 204. The Transponder receive function of this system utilizes the directional (left, right, fore or aft) and location information provided by antennas 201 and 202 to determine the directional source of an interrogation signal. Such capability is available in a conventional four-element directional antenna as is used in current TCAS systems. The Transponder receivers 208 determines the relative vertical direction of a received interrogation signal based on difference in signal strength of and determines azimuth bearing from comparison of the relative signal strength at the four elements of top antenna 201 or bottom antenna 202.

The quantity of Transponder receivers is equal to the total quantity of monopoles of both top and bottom antennas. Therefore, this system includes eight transponder receivers (four receivers for the top four-element antenna and four receivers for the bottom four-element antenna). Each typical transponder radio frequency (RF) receiver includes a variable phase shifter (in the phase system), preselector (high Q-factor first band-pass filter, low noise amplifier, and second band-pass filter), limiter, mixer, etc. Eight of these complicated Transponder RF receivers are costly, and also have high weight and occupy a substantial amount of space.

Additionally, the multifunctional aircraft transponder known to the art includes two different systems to form directional antenna pattern: phase interferometric bearing estimation and amplitude comparing bearing estimation. The main condition for high-efficiency combining of all Transponder receiver channels is the equality of different signal's phases. The phase and amplitude differences include errors relating to transmission path difference between the channels and antenna cable errors. To eliminate these errors, a special calibration network with variable phase shifters, phase detectors, additional calibration signal source is required.

The typical Transponder receiver receives 1030 MHz signals and the TCAS receiver provides receiving of 1090 MHz signals. The multifunctional aircraft transponder including connection of all receivers with common antennas through the switch does not provide selection of above signals and has additional losses for input receive signals. Therefore, this multifunctional aircraft Transponder is expensive, has extra size and weight, and poor electrical performance.

Consequently, a combined TCAS/Transponder RF transmitter/receiver with common antenna system that provides improved performance over separate TCAS and Transponder systems while solving the attendant problems of a combined TCAS/Transponder.

SUMMARY OF THE INVENTION

Accordingly, the present invention is directed to a combined TCAS/Transponder with common antenna system and transmitter. In an embodiment of the invention, common TCAS/Transponder multi-monopole top and bottom antennas may be directly connected to a top and bottom antenna modules, the top and bottom antenna modules being electrically coupled to the combined TCAS/Transponder transmitter/receiver block through connection lines.

The top and bottom antenna modules may include a beam forming network electrically connected to the TCAS/Transponder transmit/receive block to provide directional or omnidirectional TCAS or Transponder radiation antenna pattern and directional TCAS and Transponder receive antenna pattern. The TCAS/Transponder transmitter/receiver block includes switches, bandpass filters, TCAS receivers, Transponder receivers, and common TCAS/Transponder transmitter.

Top and bottom antenna modules may further include a beam forming network electrically coupled to switched divider/combiner. According to another aspect of the invention, the top and bottom antenna modules may include a beam forming network electrically coupled to single-pole double-throw switches which are electrically coupled to four-way power dividers to provide a directional or omnidirectional TCAS radiation antenna pattern, an omnidirectional Transponder radiation pattern, directional TCAS and Transponder receive antenna pattern. Additionally, diplexers may be included within top and bottom antenna modules and may reduce the number of Transponder receivers.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
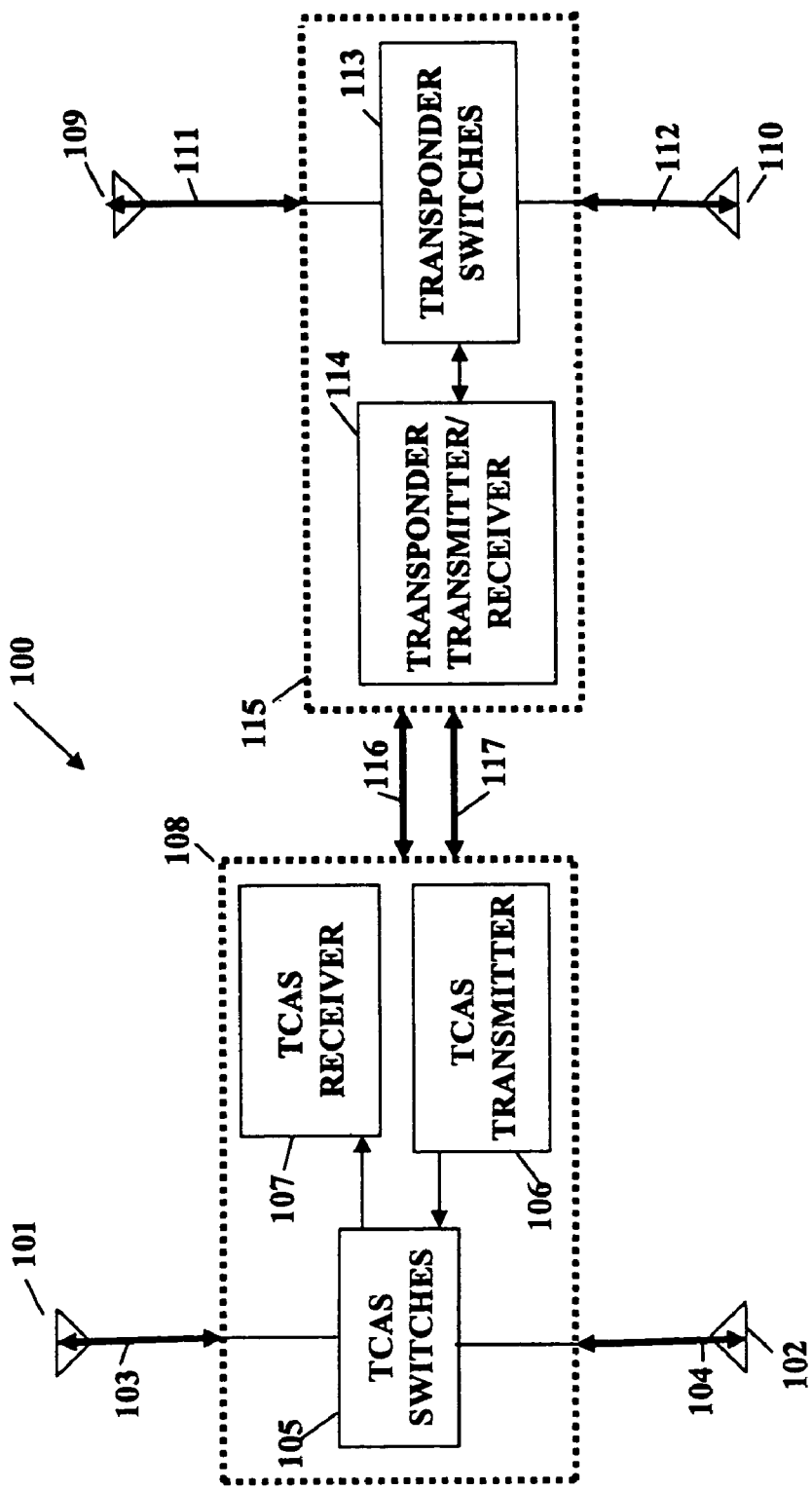
FIG. 1 is a block diagram of separate airborne TCAS and transponder systems and the interconnection between the two separate systems known to the art.
Figure 2:
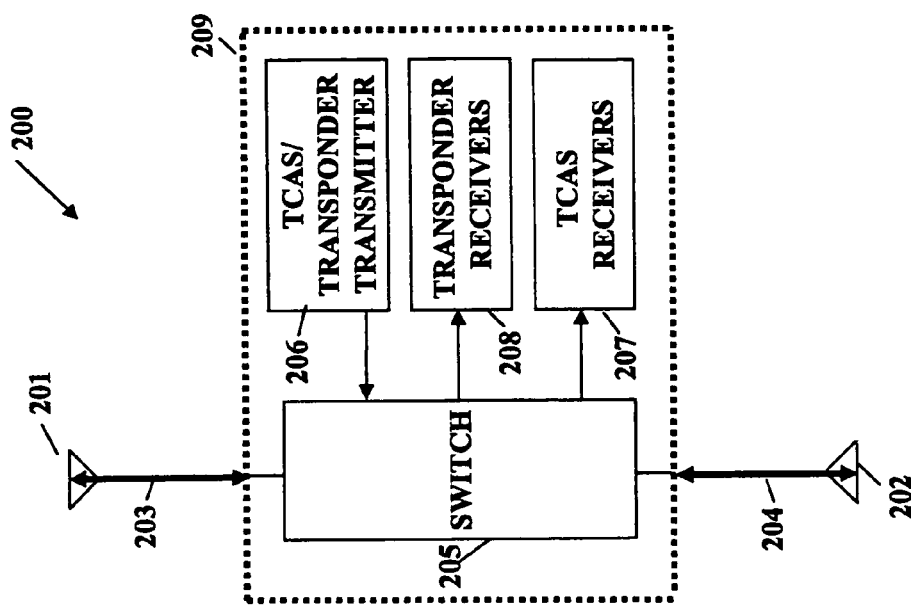
FIG. 2 illustrates a block diagram of a combined TCAS and transponder system, including a switch coupling antennas through cables and TCAS/Transponder transmitter, multichannel transponder receivers and TCAS receivers known to the art.
Figure 3:
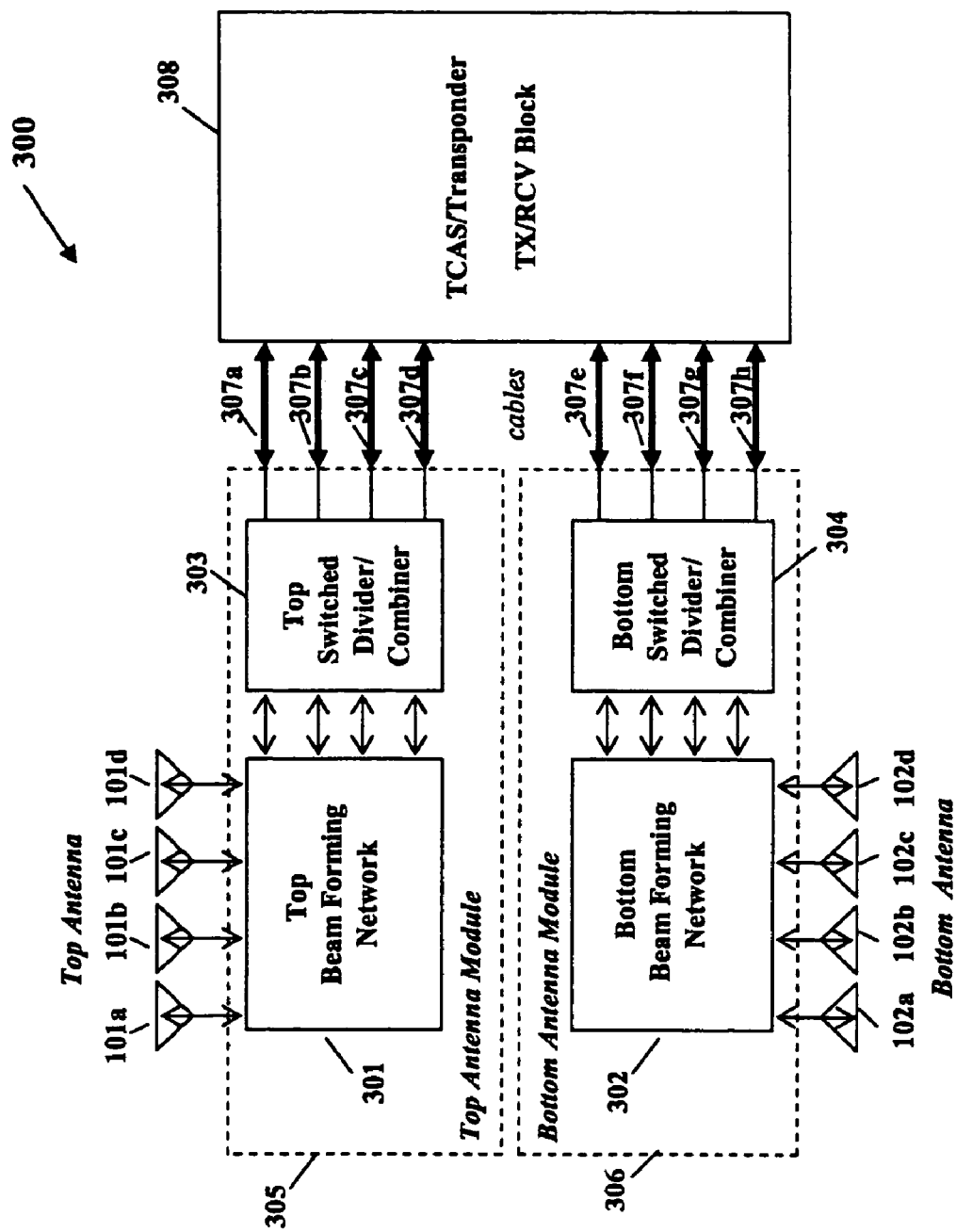
FIG. 3 illustrates a block diagram of an embodiment of the combined aircraft TCAS/Transponder with common antenna system in accordance with the present invention.

Referring to FIG. 3, a block diagram of an embodiment of the combined aircraft TCAS/Transponder with common antenna system 300 of the present invention is shown. A top antenna system 101a-d and bottom antenna system 102a-d are electrically coupled to a top antenna module 305 and a bottom antenna module 306.

Outputs of the modules 305, 306 are electrically coupled to combined TCAS/Transponder transmitter/receiver block 308 through connection lines 307a-h. Connection lines 307a-h should be understood to include all transmission paths between the antenna modules 305, 306 and the combined TCAS/Transponder transmitter/receiver block 308 which would include connecting cables, their associated connectors, and signal paths on any circuit cards associated with the system 300. Top and bottom antenna modules 305, 306 may include the top and bottom beam forming networks 301, 302 and the top and bottom switched dividers/combiners 303, 304. The beam forming network 301, 302 for typical four-monopole antenna may include four quadrature hybrids. Quadrature hybrids may be different types: two- or three-branch 3 dB couplers, coupled line 3 dB directional couplers, wireline 3 dB couplers, and the like. Advantageously, signal phase processing may be performed in the beam forming network whereby additional phase dependent elements or network for calibration of additional phase forming elements, is not necessary.

Figure 4:
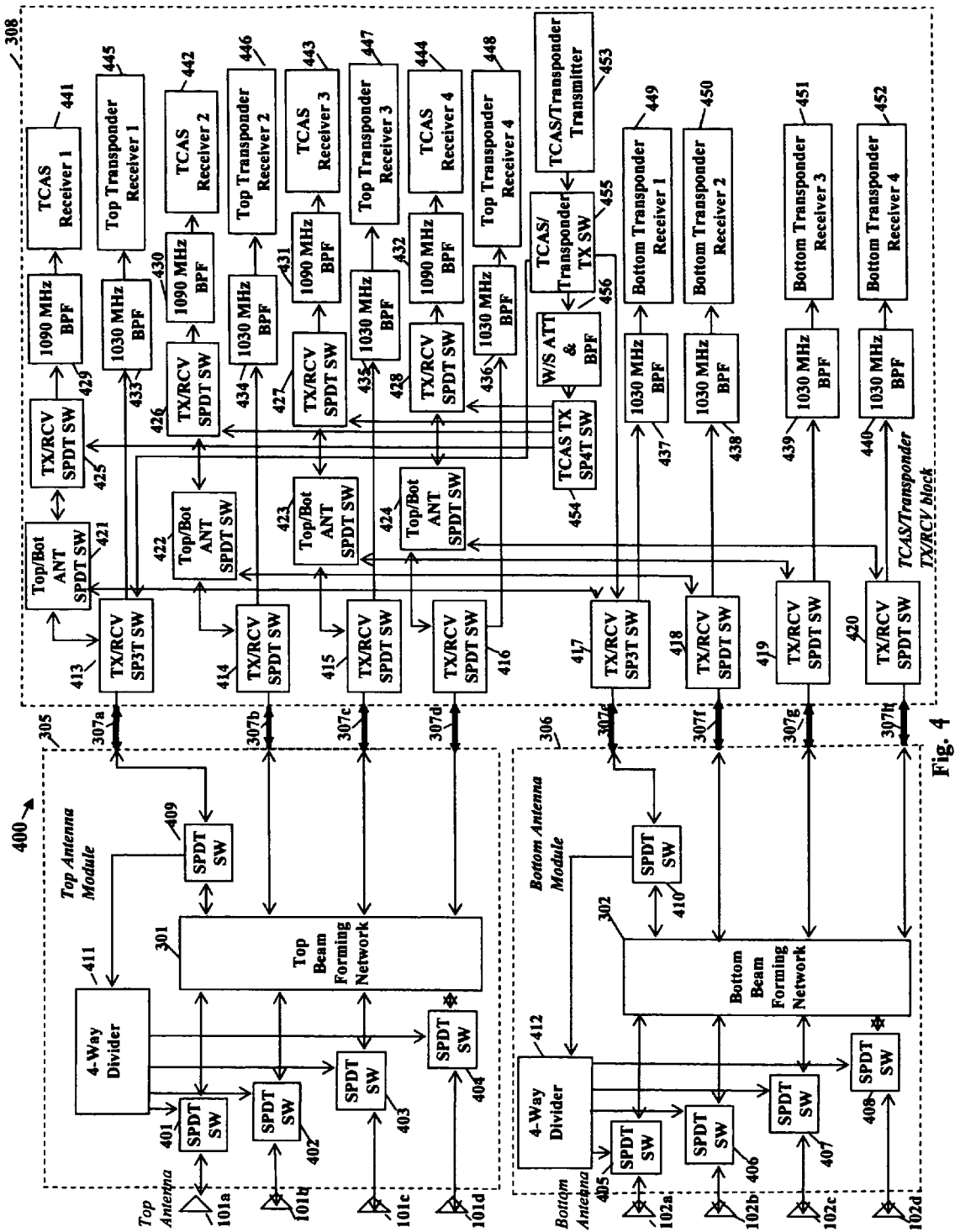
FIG. 4 illustrates a detailed block diagram of an embodiment of the combined aircraft TCAS/Transponder of the present invention including common antenna system with directional or omnidirectional TCAS radiation antenna pattern, omnidirectional Transponder radiation antenna pattern, and Transponder receive antenna pattern.

Referring to FIG. 4, FIG. 4 illustrates a more detailed block diagram of the combined aircraft TCAS/Transponder with common antenna system of the present invention. The common antenna system has the directional or omnidirectional TCAS radiation antenna pattern, the omnidirectional Transponder radiation antenna pattern, directional TCAS and Transponder receive antenna pattern. The different first and second transmit mode provides separation a TCAS transmission from a Transponder transmission respectively and do not interfere with one another. During the TCAS transmit mode, transmit signal passes from common TCAS/Transponder transmitter 453 through TCAS/Transponder TX SW 455, TCAS Whisper/Shout ATT and BPF 456, single-pole four-throw switch (SP4T SW) 454 to one transmit/receive second single-pole double-throw switch (SPDT SW) 425, 426, 427, or 428, then to one top/bottom antenna single-pole double-throw switch 421, 422, 423, or 424, then to one transmit/receive first single-pole double-throw switch 414, 415, 416, 418, 419, or 420, or single-pole three-throw switch (SP3T SW) 413 or 417 and then to antenna module 305 or 306 through one of eight connection lines 307. The 1030 MHz TCAS transmit signal are switched sequentially by transmit single-pole four-throw switch 454 and passes to the top or bottom antenna module input alternately. In the antenna module, the 1030 MHz TCAS transmit signal passes to top single-pole double-throw switch 409 or to bottom single-pole double-throw switch 410. During the 1030 MHz TCAS transmit mode, antenna 101 or 102 are activated by the activation of only one input of top beam forming network 301 or one input of bottom beam forming network 302. Activation of one input of this network provides a TCAS directional radiation antenna pattern. Position of this pattern depends on which input will be activated.

During the second 1090 MHz Transponder transmit mode, the Transponder transmit signal passes from common TCAS/Transponder transmitter 453 through TCAS/Transponder TX SW 455 to transmit/receive single-pole three-throw switch 413 or to transmit/receive single-pole three-throw switch 417. Then, the 1090 MHz Transponder transmit signal passes through connection line 307a or 307e, through single-pole double-throw switches 409 or 410 to four-way dividers 411 or 412. The dividers can be realized using conventional Wilkinson dividers, directional couplers, T- and Y-junctions, transformers, etc. These dividers split the 1090 MHz Transponder transmit signal between four top single-pole double-throw switches 401, 402, 403, 404 or four bottom single-pole double-throw switches 405, 406, 407, 408 which switch these signals to the four top antenna monopoles 101*a-d* or to the four bottom antenna monopoles 102 *a-d*. Four-way power dividers 411, 412 and beam forming networks 301, 302 are located close to the top antenna monopoles and bottom antenna monopoles respectively to minimize phase and amplitude unbalance between four inputs of top antenna 101 and four terminals of bottom antenna 102.

During the 1090 MHz Transponder transmit mode. all monopoles of top antenna 101 or bottom antenna 102 are activated simultaneously providing omnidirectional antenna patterns.

During the first receive mode, the 1090 MHz TCAS receive signals pass through top antenna 101, switches 401 and 409, 402, 403, 404 to top beam forming network 301 to TCAS/Transponder transmit/receive block 308. Top/bottom antenna switches 421, 422, 423, 424 switch four TCAS receivers 441, 442, 443, and 444 to top antenna module 305. The 1090 MHz bandpass filters 429, 430, 431, 432 provide selection of the 1090 MHz TCAS receive signals. The separate TCAS RF receivers determine the relative bearing of a distant source from the top antenna array 101.

During the same first receive mode, the 1030 MHz Transponder receive signals pass through top antenna 101 and bottom antenna 102 to switches 401 and 409, 402, 403, 404 and switches 405 and 410, 406, 407, 408 to top beam forming network 301 and bottom beam forming network 302 respectively to TCAS/Transponder transmit/receive block 308. Eight Transponder receivers 445, 446, 447, 448, 449, 450, 451, 452 receive the 1030 MHz Transponder signals simultaneously from all monopoles of antennas 101 and 102. The separate Transponder RF receivers determine the relative bearing of a distant source from the top or bottom antenna arrays.

During the second receive mode, the 1090 MHz TCAS receive signals pass through bottom antenna 102 to switches 405 and 410, 406, 407, 408 to bottom beam forming network 302 to TCAS/Transponder transmit/receive block 308. Top/bottom antenna switches 421, 422, 423, 424 switch four TCAS receivers 441, 442, 443, and 444 to bottom antenna module 306. The separate TCAS RF receivers determine the relative bearing of a distant source from the bottom antenna array 102.

During the same second receive mode, the 1030 MHz Transponder receive signals pass to eight Transponder receivers 445, 446, 447, 448, 449, 450, 451, 452 simultaneously from all monopoles of the top and bottom antennas 101, 102. The separate Transponder RF receivers determine the relative bearing of a distant source from the top or bottom antenna array similar to actions during the first receive mode. In the first and second receive modes, the TCAS signal intensities associated with each beam forming output are measured and used in the determination of the relative bearing of the intruder aircraft.

Therefore, in both receive modes, eight Transponder receivers 445, 446, 447, 448, 449, 450, 451, 452 receive the 1030 MHz Transponder signals from the both top and bottom antenna systems simultaneously, while four TCAS receivers 441, 442, 443, 444, receive the 1090 MHz TCAS signals of the top antenna 101 during the first receive mode or from bottom antenna 102 during the second receive mode. The TCAS and Transponder receivers of the combined TCAS/Transponder system utilize the directional and location information provided by the antenna and the beam forming network. The TCAS receiver function determines which of top antenna 101 and bottom antenna 102 received signal and from which direction, i.e., fore, aft, left or right. The Transponder receiver function determines direction, i.e., fore, aft, left or right from both antennas 101, 102. The Transponder receive function determines the interrogation signal from both antennas with directional antenna patterns.

Figure 5:
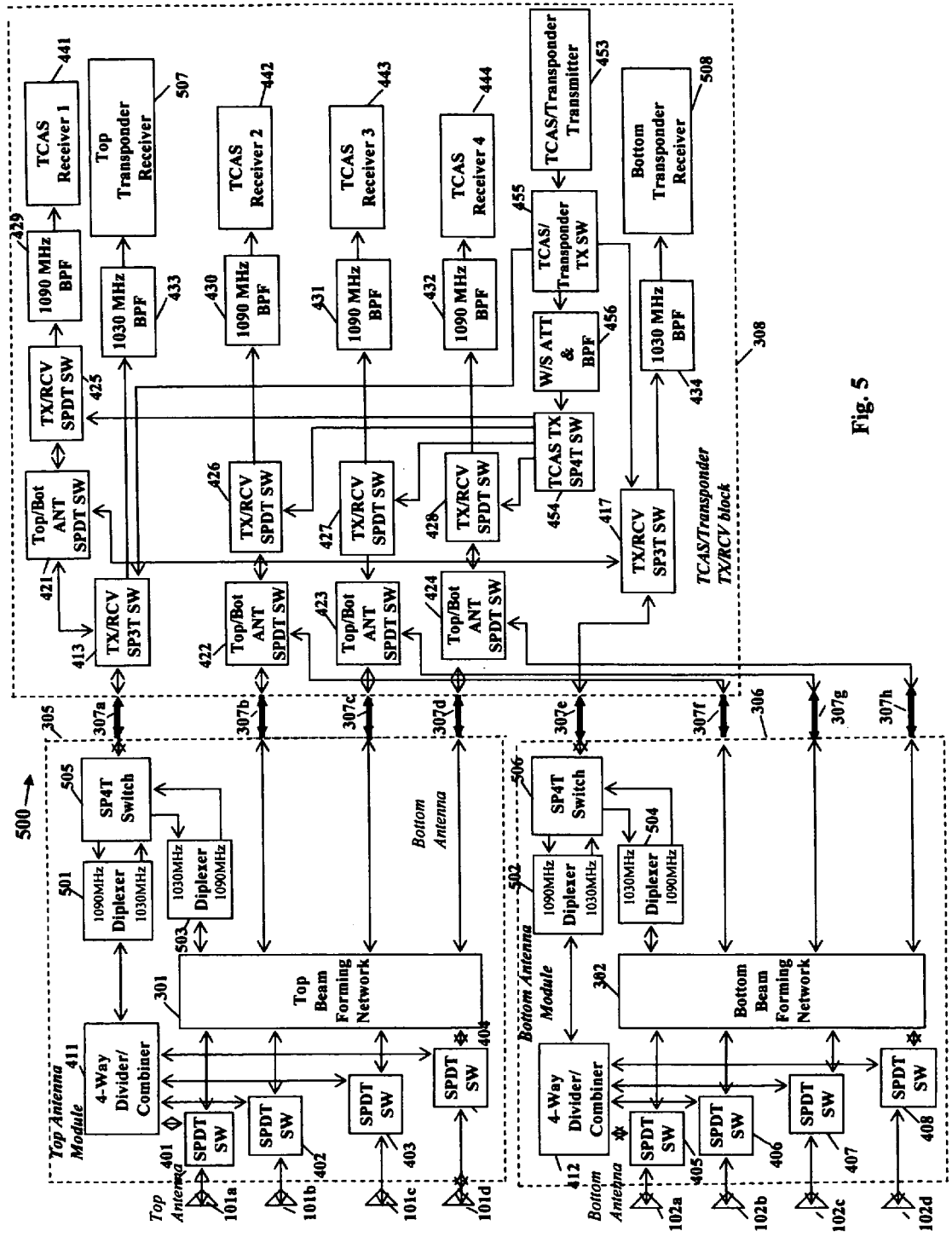
FIG. 5 illustrates a detailed block diagram of an alternative embodiment of the combined aircraft TCAS/Transponder of the present invention including common antenna system directional or omnidirectional TCAS radiation antenna pattern, omnidirectional Transponder radiation antenna pattern, directional TCAS receive antenna pattern, and omnidirectional Transponder receive antenna pattern.

Referring to FIG. 5, a detailed block diagram of an alternative embodiment of the combined aircraft TCAS/Transponder including common antenna system 500 of the present invention including directional or omnidirectional TCAS radiation antenna pattern, omnidirectional Transponder radiation antenna pattern, directional TCAS receive antenna pattern, and omnidirectional is shown. The common antenna system 500 has directional pattern for the TCAS transmit and receive modes, and omnidirectional pattern for the Transponder transmit and receive modes.

During the TCAS transmit mode, the 1030 MHz TCAS transmit signals are switched sequentially by transmit single-pole four-throw switch 454 and passes to separate top or bottom antenna module input alternately. In the antenna module, the 1030 MHz TCAS transmit signal passes to top single-pole four-throw switch 505, single-pole double-throw switch 402, 403, or 404 alternately or bottom single-pole four-throw switch 506, single-pole double-throw switch 406, 407, or 408 also alternately. In the first top and bottom antenna module channels 1030 MHz TCAS transmit signal passes through single-pole four-throw switch 505 or 506 to diplexer 503 or 504 respectively, and then through top beam forming network 301 or bottom beam forming network 302 to single-pole double-throw switch 401 or 405. Other terminals of beam forming network 301 and 302 are activated through cables 307*b*, 307*c* or 307*d* and 307*f*, 307*g* or 307*h*. During the 1030 MHz TCAS transmit mode, antenna 101 or 102 is activated by the activation of only one input of top beam forming network 301 or one input of bottom beam forming network 302. Activation of one input of this antenna network provides a TCAS directional radiation antenna pattern. Position of this antenna pattern depends on which input will be activated.

During the 1090 MHz Transponder transmit mode, the Transponder transmit signal passes from TCAS/Transmit transmitter 453 through TCAS/Transponder TX SW 455 to transmit/receive single-pole three-throw switch 413 or 417. Then, the 1090 MHz Transponder transmit signal passes through connection line 307*a* or 307*e*, single-pole four-throw switches 505 or 506 to the 1090 MHz port of diplexer 501 or 502, and then to four-way divider 411 or 412. These dividers split the 1090 MHz Transponder transmit signal between four single-pole double-throw switches 401, 402, 403, 404 or 405, 406, 407, 408 which switch these signals to the four top antenna monopoles 101, a-d simultaneously or to the four bottom antenna monopoles 102, a-d also simultaneously. The each beam forming network is activated by four equal amplitude and phase signals simultaneously, and therefore, during the 1090 MHz Transponder transmit mode, top and bottom antennas 101, 102 have omnidirectional antenna patterns.

During the first receive mode, the 1090 MHz TCAS receive signals pass through top antenna 101 to switches 401, 402, 403, 404, top beam forming network 301, diplexer 503, SP4T SW 505, cables 307*a*, 307*b*, 307*c*, 307*d* to TCAS/Transponder transmitter/receiver block 308. In the one channel of top antenna module 305 the 1090 MHz TCAS receive signal passes through the 1090 MHz port of diplexer 503, single-pole four-throw switch 505, connection line 307*a* to TCAS/Transponder transmitter/receiver block 308. Switch 505 provides connection of the 1090 MHz output of diplexer 503 with connection line 307*a* (for the 1090 MHz TCAS receive signals) and connection of the 1030 MHz output of diplexer 501 with same connection line 307a (for the 1030 MHz Transponder receive signals) and disconnection of the another two transmit ports of switch 505. Top/bottom antenna switches 421, 422, 423, 424 switch four TCAS receivers 441, 442, 443, and 444 to top antenna module 305. The separation of the receiver network from the transmitter network is realized by transmit/receive switches 413, 425, 426, 427, 428, 417. 1090 MHz TCAS bandpass filters 429, 430, 431, 432 provide selection of the 1090 MHz TCAS receive signals. Separate four TCAS RF receivers 441, 442, 443, 444 determine the relative bearing of a distant source from top antenna array 101.

During the same first receive mode, the 1030 MHz Transponder receive signals pass through top antenna 101 and bottom antenna 102 to switches 401, 402, 403, 404 and 405, 406, 407, 408, top beam forming network 301 and bottom beam forming network 302, four-way divider/combiners 411 and 412, diplexers 501 and 502, single-pole four-throw switches 505 and 506, connection lines 307a and 307e, transmit/receive single-pole three-throw switches 413 and 417, 1030 MHz bandpass filters 433 and 434 to top Transponder receiver 507 and bottom Transponder receiver 508 simultaneously. Separate Transponder RF receivers 507 and 508 determine signal from top and bottom antenna arrays 101, 102. Four way combiners 411 and 412 provide combining of the 1090 MHz Transponder signals from all antenna monopoles with the omnidirectional Transponder receive antenna patterns without any additional calibration networks because the combiners are placed close to antenna monopoles with minimum connection line widths.

During the second receive mode, the 1090 MHz TCAS receive signals pass through bottom antenna 102 to switches 405, 406, 407, 408, bottom beam forming network 302, diplexer 504, switch 506, connection lines 307e, 307f, 307g, 307h to TCAS/Transponder transmit/receive block 308. In the one channel of bottom antenna module, the 1090 MHz TCAS receive signal passes through the 1090 MHz port of diplexer 504, single-pole four-throw switch 506, connection line 307e to TCAS/Transponder transmit/receive block 308. Switch 506 provides connection of the 1090 MHz output of diplexer 504 with connection line 307e (for the 1090 MHz TCAS receive signals) and connection of the 1030 MHz output of diplexer 502 with same connection line 307e (for the 1030 MHz Transponder receive signals) and disconnection of the another two transmit ports of switch 506. Top/bottom antenna switches 421, 422, 423, 424 switch four TCAS receivers 441, 442, 443, and 444 to bottom antenna module 306. The separation of the receiver network from the transmitter network is realized by switches 413, 425, 426, 427, 428, 417. 1090 MHz TCAS bandpass filters 429, 430, 431, 432 provide selection of the 1090 MHz TCAS receive signals. The separate four TCAS RF receivers determine the relative bearing of a distant source from the bottom antenna array.

During the same second receive mode, the 1030 MHz Transponder receive signals pass to top antenna module 305 and bottom antenna module 306 and TCAS/Transponder transmit/receive block 308 similar to the first receive mode.

Therefore, in the both receive modes, two Transponder receivers 507, 508 receive the 1030 MHz Transponder signals from the both top and bottom antenna systems simultaneously, while four TCAS receivers 441, 442, 443, 444, receive the 1090 MHz TCAS signals of top antenna 101 during the first receive mode or bottom antenna 102 during the second receive mode. The TCAS receivers of a combined TCAS/Transponder system utilize the directional and location information provided by the antenna and the beam forming network. The TCAS receiver function determines which of top antenna 101 or bottom antenna 102 received signal and from which direction, i.e., fore, aft, left or right. The Transponder receiver function determines the interrogation signal from both antennas simultaneously with omnidirectional antenna pattern.

Figure 6:
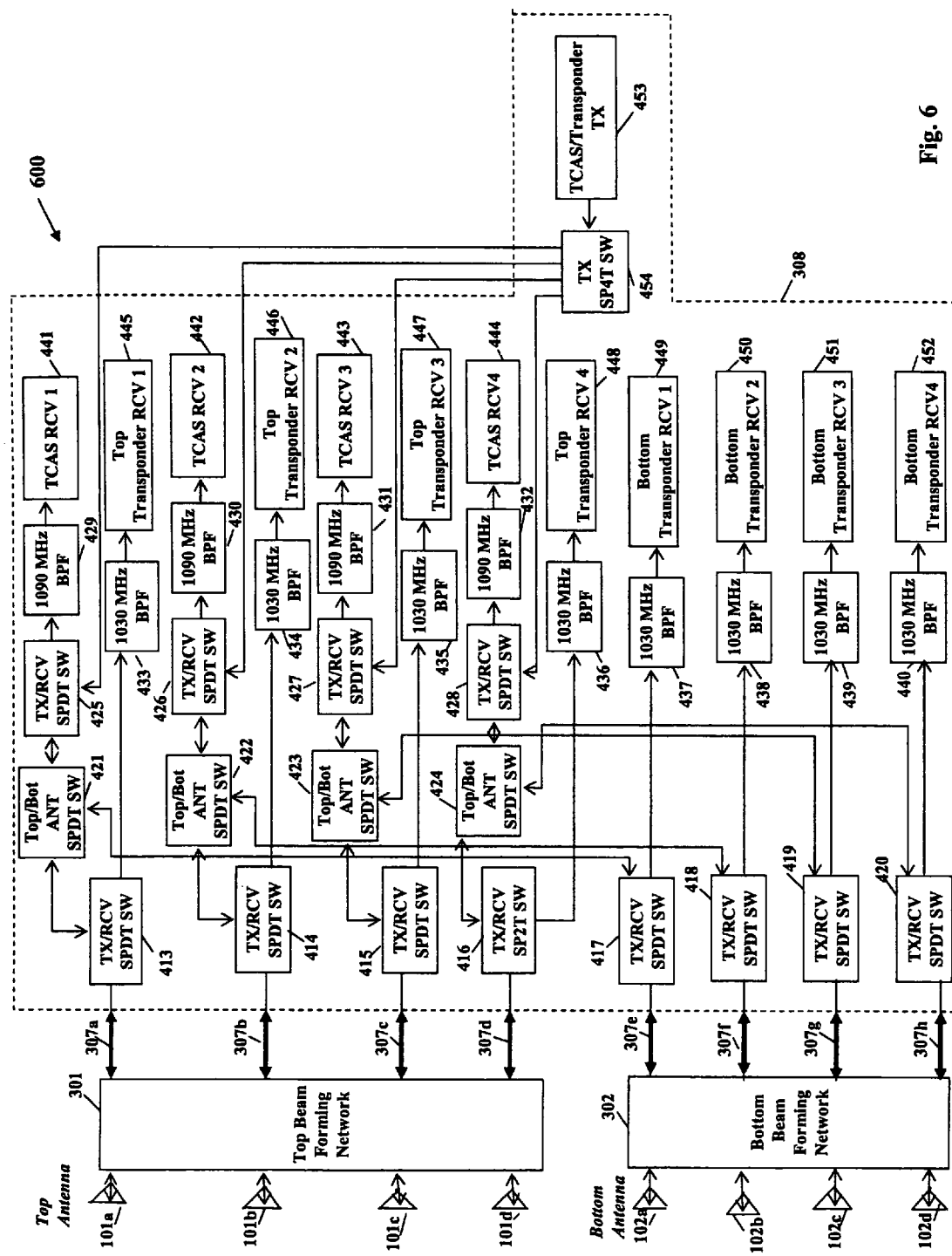
FIG. 6 illustrates a detailed block diagram of an additional alternative embodiment of the combined aircraft TCAS/Transponder of the present invention including common antenna system with directional or omnidirectional TCAS or Transponder radiation antenna pattern, directional TCAS and Transponder receive antenna pattern.

FIG. 6 illustrates a detailed block diagram of another alternative embodiment of the combined aircraft TCAS/Transponder including common antenna system 600 with the Transponder and TCAS directional antenna pattern. Antennas are connected to RF transmit/receive block through top beam forming network 301, bottom beam forming network 302, and connection lines 307. This block diagram provides the directional antenna pattern for TCAS and Transponder during the transmit and receive modes.

During the TCAS transmit mode, the 1030 MHz transmit signal from TCAS/Transponder transmitter 453 passes through TCAS/Transponder TX SW 455, W/S ATT & BPF 456, transmitter single-pole four-throw switch 454 to transmit/receive second single-pole double-throw switches 425, 426, 427, 428 sequentially. Therefore, at the same time, only one top/bottom antenna single-pole double-throw switch 421, 422, 423, or 424 passes the 1030 MHz TCAS transmit signal to one of eight first transmit/receive single-pole double-throw switches 601, 414, 415, 416, 602, 418, 419, 420. The 1030 MHz TCAS transmit signal passes through connection lines sequentially to the inputs of top beam forming network 301 or to the inputs of bottom beam forming network 302. The 1030 MHz TCAS transmit signal passes to the one of the four inputs of top beam forming network 301 or bottom beam forming network 302. Beam forming network 301 or 302 is activated by the activation of only one electrical input, thereby providing a TCAS transmit directional radiation pattern. Top four monopole antenna 101 or bottom four-monopole antenna 102 is connected to top beam forming network 301 or bottom beam forming network 302 respectively. The alternation of the active inputs of the beam forming network provides the four position of the antenna directional pattern: fore, aft, left or right. In the 1030 MHz TCAS transmit mode, when the beam forming network is activated by the activation only one input, only one of the directional antenna pattern is generated.

In some applications, the TCAS transmitter antenna pattern should be omnidirectional. In this case, during the 1030 MHz TCAS transmit mode, transmit single-pole four-throw switch 454 provides open position for all four outputs and top/bottom antenna switches 421, 422, 423, and 424 pass 1030 MHz TCAS transmit signal simultaneously to first top transmit/receive single-pole double-throw switches 601, 414, 415, 416 or to bottom first transmit/receive single-pole double-throw switches 602, 418, 419, 420. Finally, four inputs of top beam forming network 301 or bottom beam forming network 302 are activated simultaneously, thereby providing an omnidirectional TCAS radiation antenna pattern. During the 1090 MHz Transponder transmit mode, the 1090 MHz transmit signal from TCAS/Transponder transmitter 453 passes through TCAS/Transponder TX SW 455, transmitter single-pole four-throw switch 454 to transmit/receive second single-pole double-throw switches 425, 426, 427, 428 sequentially. Therefore, at the same time, only one top/bottom antenna single-pole double-throw switch passes the 1090 MHz Transponder transmit signal to one of the eight transmit/receive first single-pole double-throw switches 601, 414, 415, 416, 602, 418, 419, 420. The 1090 MHz Transponder transmit signal passes through connection lines sequentially to top beam forming network 301 or bottom beam forming network 302. The 1090 MHz Transponder transmit signal passes to one of four inputs of top beam forming network 301 or bottom beam forming network 302. Top four-monopole antenna 101 or bottom four-monopole antenna 102 is electrically coupled to top beam forming network 301 or bottom beam forming network 302 respectively. The alternation of the active inputs of the beam forming network provides the four position of the antenna directional pattern: fore, aft, left or right. In the 1090 MHz Transponder transmit mode, when the beam forming network is activated by the activation only one input, only one of the antenna directional pattern is generated.

In the existing applications, the Transponder transmit antenna pattern should be omnidirectional. In this case, during the 1090 MHz Transponder transmit mode, transmit single-pole four-throw switch 454 provides open position for the all four outputs and top/bottom antenna switches 421, 422, 423, 424 pass the 1090 MHz Transponder transmit signals simultaneously to all transmit/receive first single-pole double-throw switches 601, 414, 415, 416, or 602, 418, 419, 420. Finally, all ports of top beam forming network 301 or bottom beam forming network 302 are activated simultaneously, thereby providing a Transponder radiation omnidirectional antenna pattern.

During the first receive mode, the 1030 MHz Transponder receive signals pass to RF transmit/receive block 308 through top beam forming network 301 and bottom beam forming network 302, and connection lines 307. In RF transmit/receive block 308, the Transponder receive signals pass through transmit/receive first single-pole double-throw switches 601, 414, 415, 416, 602, 418, 419, 420, 1030 MHz bandpass filters 433, 434, 435, 436, 437, 438, 439, 440 to four top Transponder receivers 445, 446, 447, 448 and four bottom Transponder receivers 449, 450, 451, 452. In the receive mode, the 1030 MHz Transponder signal intensities associated with each beam forming output are measured and used in the determination of the relative bearing of the intruder aircraft.

In the same first receive mode, four 1090 MHz TCAS receivers 441, 442, 443, 444 receive signals from the top antenna only because top/bottom antenna single-poledouble-throw switches 421, 422, 423, 424 connect TCAS receivers 441, 442, 443, 444 (through transmit/receive second single-pole double-throw switches 425, 426 427, 428 and 1090 MHz bandpass filters 429, 430, 431, 432) to top beam forming network 301 only. The 1090 MHz TCAS receive signals from top antenna monopoles 101a, 101b, 101c, 101d pass through top beam forming network 301 to each separate channel. In the receive mode, the TCAS signal intensities associated with each beam forming output are measured and used in the determination of the relative bearing of the intruder aircraft.

By analogy with the first receive mode, during the second receive mode, the 1090 MHz TCAS receive signals pass to same separate four TCAS receivers 441, 442, 443, 444 from bottom antenna 102 only, but the 1030 MHz Transponder signals pass to top and bottom Transponder receivers from both top and bottom antennas utilizing all four monopoles of each antenna with the directional pattern for the Transponder receive signal.

Therefore, in the both receive modes, the eight Transponder receivers receive the 1030 MHz Transponder signals from the both top and bottom antenna systems simultaneously, while the four TCAS receivers receive the 1090 MHz TCAS signals of the top antenna during the first receive mode or bottom antenna during the second receive mode. The TCAS receivers and Transponder receivers of the combined TCAS/Transponder system utilizes the directional and location information provided by the antenna and the beam forming network. Accordingly, the TCAS and Transponder receiver function determines which of top antenna 101 and bottom antenna 102 received signal and from which direction, i.e., fore, aft, left or right.

Figure 7:
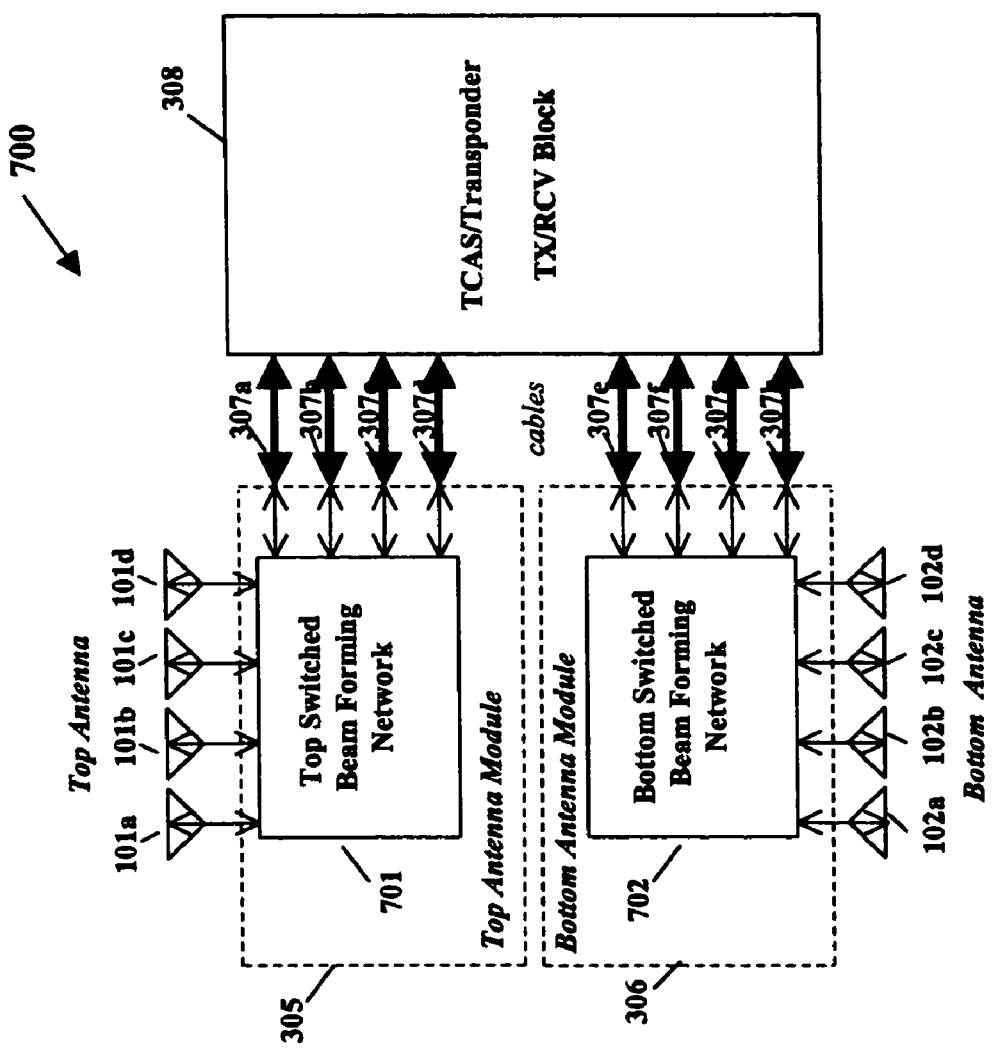
FIG. 7 illustrates a detailed block diagram of another alternative embodiment of the combined aircraft TCAS/Transponder of the present invention.

FIG. 7 illustrates a block diagram of an alternative embodiment of the combined aircraft TCAS/Transponder with common antenna system 700, including top and bottom antennas 101, 102, top and bottom switched beam forming networks 701, 702 electrically coupled through connection lines 307 to combined TCAS/Transponder transmitter/receiver block 308. Switched beam forming networks 701 and 702 provide different transmit and receive modes and form required antenna patterns (directional or omnidirectional).

As recited herein, antennas, antenna modules, and the like have been distinguished as top and bottom, however, antennas, antenna modules and the like may be referred to as first antenna and second antenna, for example. The use of top antenna, bottom antenna, and the like, may refer to the placement of the antennas on an aircraft whereby one antenna is placed at the top of an aircraft and another antenna is placed at the bottom of an aircraft. It is contemplated that antennas may be placed in other locations on the aircraft, including, the sides, front, and back by those with ordinary skill in the art without departing from the scope and intent of the present invention.

As recited herein, the combined antenna system may be employed for a TCAS transmitter/receiver and a Transponder transmitter/receiver. However, It is contemplated that those with ordinary skill in the art may employ this system to a plurality of multiple frequency systems without departing from the scope and spirit of the present invention.

It is believed that the present invention and many of its attendant advantages will be understood by the foregoing description. It is also believed that it will be apparent that various changes may be made in size, materials, shape, form, function, manner of operation, assembly and use of the components thereof without departing from the scope and spirit of the invention or without sacrificing all of its material advantages. The form herein before described being merely an explanatory embodiment thereof. Further, it is contemplated that the specific order or hierarchy of steps in the method can be rearranged while remaining within the scope and spirit of the present invention. It is the intention of the following claims to encompass and include such changes.

What is claimed is:

1. A combined multi-frequency transmitter and receiver with common antenna system, comprising:
   a first and second antenna;
   a multiple frequency transmitter and receiver;
   a first antenna module coupled to said multiple frequency transmitter and receiver and said first antenna which provides an interface between said multiple frequency transmitter and receiver and said first antenna; and
   a second antenna module coupled to said multiple frequency transmitter and receiver and said second antenna which provides an interface between said multiple frequency transmitter and receiver and said second antenna;
   wherein each of said first and second antenna modules includes a beam forming network coupled to a switched divider and combiner, said beam forming network and said switched divider and combiner providing amplitude and phase calibration whereby said multi-frequency transmitter and receiver transmits and receives signals of at least two distinct frequencies, said multiple frequency transmitter and receiver being operable to determine a range of another object from a location of said multiple frequency transmitter and receiver.

2. The combined multi-frequency transmitter and receiver with common antenna system as claimed in claim 1, wherein said first and second antennas are monopole antennas.

3. The combined multi-frequency transmitter and receiver with common antenna system as claimed in claim 2, wherein said beam forming network includes a plurality of quadrature hybrids.

4. The combined multi-frequency transmitter and receiver with common antenna system as claimed in claim 3, wherein the plurality of quadrature hybrids are coupled to each other to form a network matrix with a plurality of network ports corresponding to monopoles of said first and second antennas and a plurality of inputs corresponding to outputs of said multiple frequency transmitter and receiver and a plurality of outputs corresponding to inputs of said multiple frequency transmitter and receiver.

* * * * *